Feb. 20, 1945. E. J. SCHAEFER 2,369,986
ELECTRIC PROTECTIVE MEANS
Filed July 21, 1942
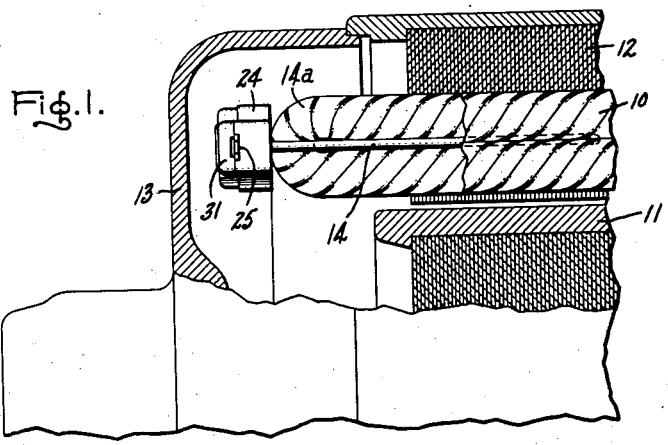
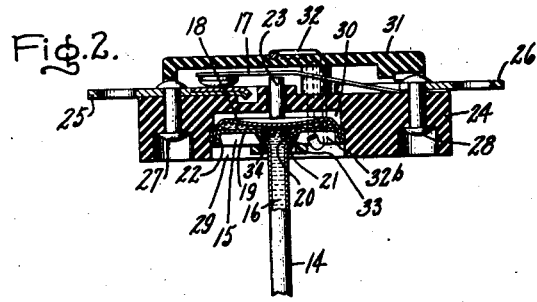
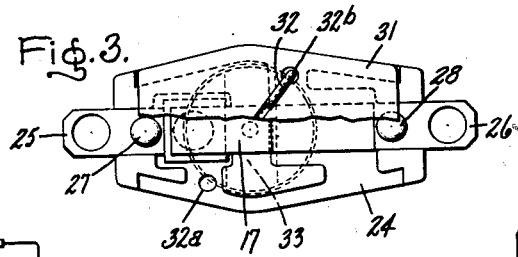
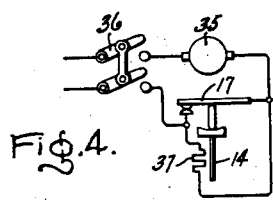
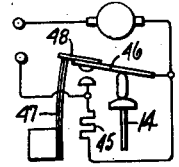
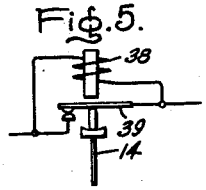
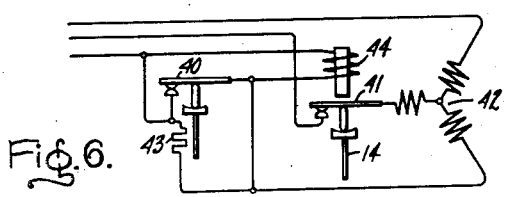
Inventor:
Edward J. Schaefer,
by Harry E. Dunham
His Attorney.

Patented Feb. 20, 1945

2,369,986

UNITED STATES PATENT OFFICE 2,369,986

ELECTRIC PROTECTIVE MEANS

Edward J. Schaefer, Fort Wayne, Ind., assignor to General Electric Company, a corporation of New York Application July 21, 1942, Serial No. 451,731

4 Claims. (Cl. 172—120)

My invention relates to electric protective means, more particularly to means for protecting electric motors and the like against abnormal high temperatures caused by excessive current in the motor windings, and has for its object a simple, reliable and inexpensive protective means of this character.

My invention is especially useful in the protection of small electric motors of fractional horsepower size, such as split phase or capacitor motors used in the driving of household refrigerators, stokers, washing machines and the like.

It is a further object of my invention to provide a protective means which is in close thermal relation with the motor windings so as to respond directly to changes in temperature of the motor winding itself without the use of auxiliary heating means and which forms in effect a part of the motor itself.

In carrying out my invention, I provide a temperature responsive expansible fluid device comprising a small tube which extends through the end turns of the motor winding into and between the turns lying in a stator slot. This tube is secured frictionally in position in the winding and at its outer end supports a container provided with a snapping disk operating member, together with a switch in the motor circuit operated by the disk.

For a more complete understanding of my invention, reference should be had to the accompanying drawing, Fig. 1 of which is a fragmentary vertical sectional view of an electric motor equipped with a protective device embodying my invention; Fig. 2 is a vertical sectional view of the protective device; Fig. 3 is a plan view with part of the top cover broken away of the device shown in Fig. 2; Fig. 4 is a diagrammatic representation of a modified form of my invention showing its connection in a motor circuit; Fig. 5 is a fragmentary view similar to Fig. 4 showing a modified form of my invention; Fig. 6 is a diagram showing a modified form of my invention as applied to a three-phase motor; while Fig. 7 is a diagram of a modified form of my invention provided with a separate thermostat for holding the switch open.

Referring to the drawing, I have shown my invention in one form as applied to a typical small motor of the single split phase type comprising a stator winding 10 and a squirrel cage rotor 11. The stator winding 10 has its turns suitably wound or mounted in slots provided for it in an iron stator 12. Furthermore, the motor is enclosed by a suitable casing comprising an end shield 13 at each end.

In accordance with my invention, I provide a thermal protective device for the motor winding 10 which is in direct structural and thermal relation with the winding, is supported by the winding, and, in fact, is a unitary part of the winding. This device comprises a tube 14 of suitable small size having a closed inner end which lies between the turns of the winding, a container 15 constituting a snap action device mounted on the outer end of the tube 14 and forming with the tube a sealed chamber for an expansible fluid 16 contained in the chamber, and a switch arm 17 operated by a movable pressure responsive wall 18 of the container.

Preferably, the tube 14 is inserted in position in the motor winding after the winding has been put in place in the slots in the stator element 12 by first forming an aperture in the winding by means of a suitable pin or punch. This punch is forcibly inserted through the end between the end turns 14a and between the turns of the winding in a slot of the stator member 12. It is inserted carefully to avoid damage to the insulation on the turns and displaces and compacts the turns or lengths of wire somewhat to leave an opening into which the tube 14 is inserted. Preferably, the pin is somewhat smaller in diameter than the tube so that the tube is held by friction securely in place. The tube is long enough so that its inner end lies in the innermost part of the winding from which the dissipation of heat is the slowest, this part being the hottest part of the winding.

The container on the outer end of the tube, as shown, comprises a disk 19 having an aperture at the center through which the outer end of the tube extends. As shown in Fig. 2, a joint is formed between the end of the tube and the disk by expanding the tube adjacent its end to form a peripheral projection 20 somewhat larger than the hole in the disk and then, after the end of the tube is inserted crimping or spinning over the end of the tube onto the disk, a soldered joint 21 is furthermore provided between the tube and the disk.

Around the periphery of the disk 19 is formed a groove or trough 22 into which is inserted the depending peripheral edge of the disk wall 18. The sides of the groove 22 are then compressed onto the wall and the parts further secured together and sealed at their peripheries by a soldered joint.

Preferably, as shown in Fig. 2, the movable wall 18 normally has a concave disk form. Upon generation of a sufficient fluid pressure in the sealed chamber, this concave disk snaps upward at its center to an inverted or convex position moving upward with it a pin 23 made of insulating material which engages and moves upward to its open circuit position the spring switch arm 17.

As a temperature responsive fluid 16, I preferably use pure propyl alcohol having a boiling point of about 97° C. Preferably, this vaporizable liquid is put into the chamber while the liquid is heated to a temperature near its boiling point, the chamber being completely or nearly completely filled with the liquid. This assures sufficient space in the tube to take care of incompressible expansion of the liquid so that the compressible gas formed by boiling of the alcohol is utilized in the snapping of the disk 18. This assures snap action of the disk whereas the expansion of a liquid itself, if the chamber were completely filled with a liquid at a low temperature, might be too slow to produce a snap action in the movement of the disk.

This boiling temperature of about 97° C. of the alcohol in combination with the intimate thermal relation between the end of the tube and the interior hottest part of the winding assures operation of the device so as to prevent overheating of the motor winding while at the same time allowing the motor winding to operate at a maximum permissible temperature up to 105° C. at the hottest point of the winding. It will be understood that the outer end of the tube 14, together with the container on the end of the tube, operates at a lower temperature than the inner end of the tube because the exposed end turns of the winding at this point are at a lower temperature. This is on account of the more effective cooling of the end turns by the entrapped agitated air in the motor casing or housing. For example, the entrapped air on the end turns in a typical case was heated to a temperature of about 90° C. when the hottest part of the motor winding reached its maximum temperature of 105° C. Furthermore, the liquid in the chamber must be heated to a temperature somewhat higher than the boiling point of 97° C. in order to generate the required pressure of about 10 pounds per square inch to snap the disk. The mean temperature of the liquid is thus sufficient to produce operation of the device and opening of the motor circuit so as to limit the temperature of the hottest part of the motor to the predetermined maximum of 105° C. When the device cools to a predetermined low temperature, the fluid pressure decreases and the disk snaps back in accordance with its bias to its concave shape, as shown.

A support 24 made of electrically insulating material, such as a molded compound, is provided for the spring contact arm 17 and the electric terminals 25 and 26 which are secured to the support, as shown, by rivets 27 and 28, the inner end of the terminal 25 constituting a stationary contact cooperating with a movable contact on the end of the arm 17.

This support 24 is provided with a central bore 29 just large enough to receive the container 15 with a sliding fit. This bore is countersunk at the bottom to form an operating space 30 for the disk 18 and also to form a ledge against which the outer edge of the container disk is held.

A cover 31 made of electrically insulating material encloses the contact arm 17. This cover and the container and tube are secured to the support 24 by means of an inverted U-shaped wire clip 32 having its upper cross part lying in an oblique groove in the top of the cover and its two prongs extending downward through holes 32a and 32b in the cover and the support 24. The lower ends of the clip are bent over the edge of the diaphragm support 22. A bar 33 of electrically insulating material has an aperture 34 at its center through which the tube 14 extends while the ends of the bar fit in the bore 29, the lower side of the bar being substantially flush with the lower face of the support 24, as seen in Fig. 2. This bar is held in place by means of a suitable cement.

In Fig. 4, I have shown diagrammatically a protective device embodying my invention in the circuit of an electric motor 35 which may be connected by a manually operated switch 36 to a suitable source of electric supply. In this form of my invention, I have provided an electric heating resistor 37 having its terminals electrically connected across the switch operated by the contact arm 17. Thus, when the contact arm is in its closed circuit position, as shown, the resistance 37 is short-circuited but, in the event of an excessive temperature and opening of the contact arm, the resistance 37 is connected in circuit with the motor and generates enough heat to maintain the tube 14 at an operating temperature. The current through the resistance 37 is, of course, only a small fraction of the current required to operate the motor 35 and, consequently, the motor remains at a standstill and the contact arm 17 is held in its open circuit position by the temperature responsive device. In order to restart the motor, the switch 36 must first be opened and the temperature responsive device allowed to cool so that the contact arm 17 will move to its closed circuit position. This arrangement is of advantage in installations where repeated starting and stopping of the motor in the event of a continued overload is not desirable.

In Fig. 5 I have shown a modified form which operates to hold the motor circuit open after it has been opened by the temperature responsive device. In this case, instead of using a heating resistance, an operating coil or solenoid 38 is provided which is connected across the contact arm. Also, an armature 39 is provided on the end of the contact arm. Thus when the contact arm is moved to its open circuit position in response to temperature, the coil 38 is energized and the motor circuit thus maintained open until it is opened elsewhere.

In Fig. 6 I have shown two temperature responsive contact arms 40 and 41 in two legs of the three-phase windings 42 of a three-phase motor. Each of the contact arms 40 and 41, as shown in Fig. 6, is operated by a temperature responsive device 14 constructed as previously described. The thermal device for the contact arm 40 is provided with a heating resistor 43 similar to the resistor 37 of Fig. 4. Also, across the switch operated by the arm 40 is an electromagnet 44 similar to the electromagnet 38 of Fig. 5, the contact arm 41 being provided with an armature.

These two thermal devices of Fig. 6 are mounted in suitable separate positions on the motor so as to be, for example, responsive directly, respectively, to the temperatures of the motor windings controlled by them.

With this arrangement of Fig 6, two of the phases of the motor will be deenergized in case of overheating, and both will remain open circuited until the contact arm 40 is reclosed by the cooling of its thermostat. The heating to a predetermined maximum temperature of either one of the thermostats causes that thermostat to open its contact arm. If the other thermal device has not at that time reached that maximum temperature, it will soon be heated to that temperature by the increased rise in temperature of the motor having two phases only of its winding energized. Thus, if the contact arm 40 is opened first, the contact arm 41 will be soon thereafter opened by its thermal device, and if the contact arm 41 is opened first, the contact arm 40 will be opened soon after.

The coil 44, after the opening of the contact arm 40, is connected across the resistance 43 and is energized sufficiently to hold the contact arm 41 in its open circuit position. The coil 44, however, does not apply enough force to the contact arm 41 to move the contact arm 41 to its open circuit position. The coil 44 does hold the contact arm 41 in its open circuit position after the contact arm 41 has been moved to that position by its thermal device. Therefore, the contact arm 40 must be moved to its closed circuit position by the cooling of its thermal device, and the coil 44 thereby be short circuited, to provide for the reclosure of the contact arm 41 by the cooling of its thermal device. Thus the contact arm 40 must always reclose first.

When the resistance 43 is provided, as shown in Fig. 6, the device must be manually reset, as described in connection with Fig. 4, the resistance 43 generating enough heat after the opening of the contact arm 40 to hold the contact arm 40 in its open circuit position. Thus, the motor windings must be deenergized by the opening of a switch, not shown in Fig. 6, after which the thermal devices cool and reclose the contact arms.

The arrangement of Fig. 6 can be made automatically reset by simply disconnecting the heating resistor 43, the remaining connections being as shown in Fig. 6. In that case, when the two contact arms 40 and 41 have been moved to their open circuit positions, the flow of current in the motor windings is interrupted and the two thermal devices begin to cool. The contact arm 40 is closed first by the cooling of its thermal device, the coil 44 being short-circuited at the same time. Thereafter, the contact arm 41 moves to its closed circuit position. This may take place immediately upon the short-circuiting of the coil 44 if the thermal device of the contact arm 41 has at that time cooled sufficiently.

In the modified form of my invention shown in Fig. 7, I provide a heating resistor 45 connected across the switch operated by the contact arm 46 in the same manner as the resistor 37 of Fig. 4. In this form, however, the resistor 45 is thermally isolated from the thermal device 14 and is in thermal relation with a separate thermally responsive means shown as a bimetallic strip thermostat 47. The upper movable end of the thermostat 47 moves toward the right to the position shown in Fig. 7 when heated by the resistor 45 after the opening of the switch by the device 14, the end of the thermostat moving under a latch projection 48 made of electrically insulating material secured to the contact arm 46. Thus the thermostat holds the switch arm in its open circuit position while the device 14 cools. In order to reclose the switch, the supply circuit must be opened as by the opening of a manually operated switch (not shown) similar to the switch 36 of Fig. 4. After the circuit is thus opened, the thermostat 47 cools and its upper end moves toward the left out of engagement with the projection 48 and releases the switch arm 46 whereupon the switch arm recloses in accordance with its bias, it being assumed that in the meantime the thermal device 14 has cooled sufficiently to allow the contact arm to move back to its closed position. The motor can then be started again by reclosing its supply circuit.

This arrangement of Fig. 7 has the advantage over the arrangement of Fig. 4 in that the resistor 45 can be selected to operate in a wider range of ambient temperatures without over-heating of the resistor or thermal element at the high ambient temperatures.

I contemplate also that the separate latching thermostat arrangement of Fig. 7 can be used in the system of Fig. 6.

While I have shown a particular embodiment of my invention, it will be understood, of course, that I do not wish to be limited thereto since many modifications may be made, and I therefore contemplate by the appended claims to cover any such modifications as fall within the true spirit and scope of my invention.

What I claim as new and desire to secure by Letters Patent of the United States is:

1. The combination with an electric motor provided with a polyphase stator winding of a first thermal device mounted on said stator so as to be responsive to the temperature of a first one of said windings, normally closed switching means in circuit with said first winding opened by said first thermal device in response to a predetermined temperature, a second thermal device mounted in thermal relation with a second of said stator windings, a normally closed second switching means in circuit with said second winding arranged to be moved to its open position by said second thermal device in response to a predetermined temperature, an operating coil for holding said second switching means in its open circuit position, and connections for connecting said operating coil across said first switching means so that said coil is energized when said first switching means opens.

2. The combination with an electric motor provided with a polyphase stator winding of a first thermal device mounted on said stator so as to be responsive to the temperature of a first one of said windings, normally closed first switching means in circuit with said first winding opened by said first thermal device in response to a predetermined temperature, a second thermal device mounted in thermal relation with a second of said stator windings, a normally closed second switching means in circuit with said second winding arranged to be moved to its open position by said second thermal device in response to a predetermined temperature, an operating coil for holding said second switching means in its open circuit position, connections for connecting said operating coil across said first switching means so that said coil is energized when said first switching means opens, and electric heating means for said first thermal device connected across said first switching means so as to be energized when said first switching means opens.

3. The combination with an electric device having a stator provided with slots, a winding of electrically insulated wire in said slots having end turns projecting from said slots, said winding in said slots comprising a plurality of lengths of said insulated wire, a tube having a closed end extending between said end turns and between said lengths into one of said slots with said closed end of said tube in an innermost position in said slot in engagement with substantially the hottest part of said winding, said tube being secured in position in said slot by the friction between said lengths and said tube, a snap action device on the outer end of said tube including a sealed container communicating with the interior of said tube, an expansible fluid in said container and tube for operating said snap action device when said innermost hottest part of said winding is heated to a maximum permissible operating temperature for said electric device, normally closed switching means in the circuit of said electric device mounted on said container, and an operating connection between said switching means and said snap action device whereby said snap action device opens said switching means thereby to deenergize said electric device upon operation of said snap action device in response to a predetermined high temperature, said snap action device and switching means being supported solely by said tube.

4. The combination with an electric device having a stator provided with slots, a winding of electrically insulated wire in said slots having end turns projecting from said slots, said winding in said slots comprising a plurality of lengths of said insulated wire, a tube having a closed end inserted between said end turns and between said lengths into one of said slots with said closed end of said tube in an innermost position in said slot in engagement with substantially the hottest part of said winding, said tube being secured in position in said slot by the friction between said lengths and said tube, a sealed container on the outer end of said tube communicating with the interior of said tube, a snap action disc forming a wall of said container, an expansible fluid in said container and tube for snapping said disk to an inverted position when said innermost hottest part of said winding is heated to a maximum permissible operating temperature for said electric device, normally closed switching means in the circuit of said electric device mounted on said container, and an operating connection between said switching means and said disc whereby said disc opens said switching means thereby to deenergize said electric device when said disc is snapped to its inverted position in response to a predetermined high temperature, said container and switching means being supported solely by said tube.

EDWARD J. SCHAEFER.